United States Patent [19]
Abe et al.

[11] Patent Number: 5,828,918
[45] Date of Patent: Oct. 27, 1998

[54] ELECTRO-DEVELOPING TYPE CAMERA USING ELECTRO-DEVELOPING RECORDING MEDIUM

[75] Inventors: Tetsuya Abe; Makoto Mogamiya, both of Tokyo, Japan

[73] Assignee: Asahi Kogaku Kogyo Kabushiki Kaisha, Tokyo, Japan

[21] Appl. No.: 929,055

[22] Filed: Sep. 15, 1997

Related U.S. Application Data

[63] Continuation of Ser. No. 651,763, May 22, 1996, abandoned.

[30] Foreign Application Priority Data

May 22, 1995 [JP] Japan ................................... 7-146764

[51] Int. Cl.⁶ .................................................. G03B 17/00
[52] U.S. Cl. ........................................ 396/439; 396/661
[58] Field of Search .................................. 396/439, 661; 355/211; 361/220, 221

[56] References Cited

U.S. PATENT DOCUMENTS

| | | | |
|---|---|---|---|
| 1,203,030 | 10/1916 | Martucci | 361/221 |
| 1,206,357 | 11/1916 | Nusbaum | 361/221 |
| 1,530,704 | 3/1925 | Thomson | 396/661 |
| 4,336,565 | 6/1982 | Murray et al. | 361/221 |
| 4,494,166 | 1/1985 | Billings et al. | 361/221 |
| 4,737,809 | 4/1988 | Konno | 396/542 |
| 4,985,719 | 1/1991 | Tsurukawa et al. | 396/129 |
| 5,424,156 | 6/1995 | Aoki et al. | 430/59 |
| 5,508,879 | 4/1996 | Kitamura et al. | 361/221 |

FOREIGN PATENT DOCUMENTS

| | | |
|---|---|---|
| 5-2280 | 1/1993 | Japan . |
| 6251491 | 9/1994 | Japan . |

*Primary Examiner*—Eddie C. Lee
*Attorney, Agent, or Firm*—Greenblum & Bernstein P.L.C.

[57] ABSTRACT

An electro-developing type camera has an electro-developing recording medium for recording and developing an optical image formed thereon. A conductive electric-charge-eliminating brush is provided to establish electrical contact and physical contact with the recording medium. The electric-charge eliminating brush eliminates an electric charge from the recording medium due to the electrical contact between the brush and the recording medium, and removes particulate matter such as dust from the recording medium due to the physical contact between the brush and the recording medium.

10 Claims, 14 Drawing Sheets

ELECTRO-DEVELOPING TYPE CAMERA USING ELECTRO-DEVELOPING RECORDING MEDIUM

This application is a continuation, of application Ser. No. 08/651,763, filed May 22, 1996, now abandoned.

BACKGROUND OF THE INVENTION

1. Field of the Invention

The present invention relates to an electro-developing type video camera using an electro-developing recording medium in which an optical image obtained through a photographing lens system is electronically and directly recorded and developed as a visible image very rapidly.

2. Description of the Related Art

Such an electro-developing recording medium per se is known. For example, Japanese Unexamined Patent Publication No. 5-2280 and U.S. Pat. No. 5,424,156 disclose one type of electro-developing recording medium comprising an electrostatic information recording medium and an electric charge keeping medium. The electrostatic information recording medium includes a photoconducting layer and an inorganic oxide material layer, and the electric charge keeping medium includes a liquid crystal display, both mediums media being combined to face each other with a small gap therebetween. A camera using the electro-developing recording medium has already been proposed, and is referred to as an electro-developing type camera hereinafter.

In the electro-developing type camera, when a photographing operation is executed, a voltage is applied between the electrostatic information recording medium and the electric charge keeping medium, and an optical image is formed on a light receiving surface of the electro-developing recording medium (i.e., the electrostatic information recording medium) by a photographing lens system. An electric charge distribution is produced over the electrostatic information recording medium in accordance with a light intensity distribution of the optical image formed thereon, so that the intensity of an electric field acts on the liquid crystal of the electric charge keeping medium in accordance with the electric charge distribution. Thus, an image derived from the optical image is reproduced in the electric charge keeping medium as a visible image. Namely, as soon as the optical image is formed on the electrostatic information recording medium, the image is recorded and developed in the electric charge keeping medium.

When the electric charge keeping medium is constituted as a memory type liquid crystal display, the developed visible image can be kept therein even if the electric field is eliminated from the electro-developing recording medium. In the memory type liquid crystal display, the developed image can be erased by heating it to a predetermined temperature. In this case, the same electro-developing recording medium can be repeatedly used for photographing.

The electro-developing type camera using the electro-developing recording medium may be provided with an image reader comprising a solid image line sensor such as a CCD (charge-coupled device) line sensor for optically and electronically reading a developed image of the electro-developing recording medium, and the read image signals obtained from the CCD image sensor may be processed in various manners. For example, the read image signals may be stored in a second recording medium such as an IC memory card, a floppy disk, a hard disk or the like. Also, the read image signals may be processed such that the developed image is reproduced by a printer or on a TV monitor on the basis of the processed image signals.

In the electro-developing recording medium, an optical color image per se cannot be directly developed and recorded. Before an optical image obtained by the photographing lens system can be reproduced as a color image by a printer or on a TV monitor, a light beam passing through the photographing lens system and carrying the optical image must be separated by an optical separator into three primary color light beam components, for example, a red light beam component, a green light beam component, and a blue light beam component, such that the primary color light beam components are focussed on three electro-developing recording mediums, respectively. Then, the color images are read by the CCD line sensor to produce the red image signals, the green image signals, and blue image signals, and these color image signals are processed so as to reproduce a color image by a printer or on a TV monitor.

The electro-developing recording medium as mentioned above may be electrostatically charged due to triboelectrification, and may have dust, other contaminants, etc. electrostatically attracted to the electro-developing recording medium. Of course, when the electrostatic attraction of dust, etc. is caused over the light receiving surface of the electro-developing recording medium, the presence of dust, etc. exerts a harmful influence, and degrades an image to be recorded and developed in the electro-developing recording medium. Thus, the dust, etc. must be removed from the light receiving surface of the electro-developing recording medium before the execution of a photographing operation.

SUMMARY OF THE INVENTION

Therefore, an object of the present invention is to provide an electro-developing type camera using an electro-developing recording medium, such that an electrostatically-produced charge is eliminated from the electro-developing recording medium, and electrostatically-attracted dust, etc. are removed from a light-receiving surface thereof, whereby an image can be properly recorded and developed in the electro-developing recording medium without being subjected to any harmful influence derived from the presence of dust, etc.

In accordance with the present invention, an electro-developing type camera using an electro-developing recording medium is provided. The electro-developing type camera comprises a conductive electric-charge-eliminating device which is enabled to establish an electrical contact and a physical contact with respect to the electro-developing recording medium. The conductive electric-charge-eliminating device is constituted such that an electric charge is eliminated from the electro-developing recording medium due to the electrical contact therebetween, and such that dust, etc. are removed from the electro-developing recording medium due to the physical contact therebetween.

The conductive electric-charge-eliminating device may be formed as a conductive brush device, and may be arranged beside a passage of the electro-developing recording medium to a photographing position such that a light receiving surface of the electro-developing recording medium is swept with the conductive brush device.

Preferably, the electro-developing type camera comprises a camera body having a slot formed therein for inserting the electro-developing recording medium toward the photographing position. The conductive brush device is movably provided beside the slot in the camera body, and is resiliently biased to the slot to thereby close the same. Additionally, the electro-developing recording medium is forcibly inserted into the slot against the resilient biasing force of the conductive brush device.

The conductive brush device may comprise a conductive brush assembly including a brush member, and a holder member for detachably holding the brush member. Also, the conductive brush device may comprise a conductive brush member constituted so as to move out of the slot. Further, the conductive brush device may comprise a conductive brush member which is movable between an electric-charge-eliminating position at which the electric contact and the physical contact can be established and a retracting position at which no contact is established between the conductive brush member and the electro-developing recording medium. Furthermore, the conductive brush device may comprise a conductive roller type brush member which is rotationally driven, and which is engaged with the electro-developing recording medium so as to move the same toward the photographing position.

On the other hand, the conductive electric-charge-eliminating device may be formed as a conductive brush device, and may be arranged beside a photographing position at which the optical image is recorded on, and developed in, the electro-developing recording medium. In addition, the electric contact and the physical contact are established between the conductive brush device and the electro-developing recording medium positioned at the photographing position.

BRIEF DESCRIPTION OF THE DRAWINGS

The object and other objects of the present invention will be better understood from the following description, with reference to the accompanying drawings in which.

DESCRIPTION OF THE PREFERRED EMBODIMENTS

Figure 1:
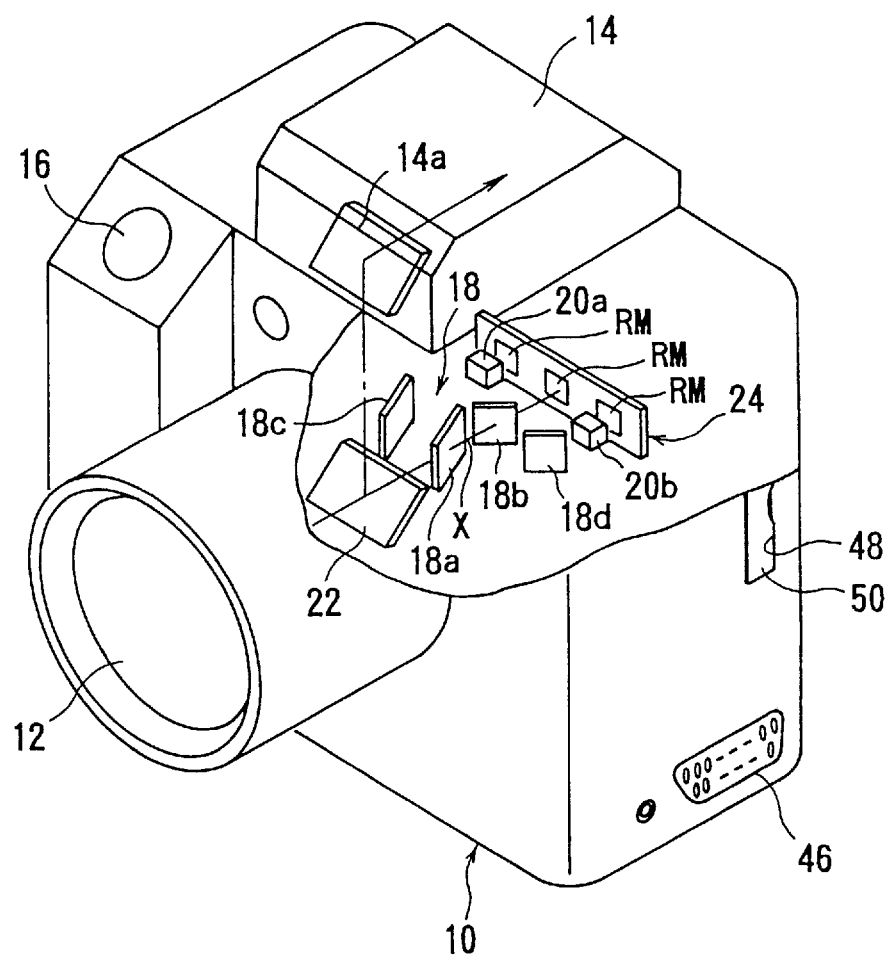
FIG. 1 is a partially-cut-away schematic perspective view showing a first embodiment of an electro-developing type camera using an electro-developing recording medium according to the present invention.

FIG. 1 is a schematic perspective view of a first embodiment of an electro-developing camera according to the present invention, where part of a camera body 10 thereof is cut away to partially show the interior thereof. The camera body 10 has a box-like configuration, and a photographing lens system 12 provided on approximately a center location of the front face thereof. A view finder 14 is provided at a center location of a top surface of the camera body 10, and a release switch 16 is provided at a side of the view finder 14.

In this embodiment, the electro-developing camera is constituted such that an optical image obtained by the photographing lens system 12 can be reproduced as a color image by a printer or on a TV monitor. To this end, the camera comprises an optical separator 18 arranged in the camera body 10 at a back side of the photographing lens system 12, and the optical separator 18 includes two dichroic filters 18a and 18b, and two total reflecting mirrors 18c and 18d.

The dichroic filter 18a is arranged so as to define an angle of 45 (135) degrees with an optical axis X defined by the photographing lens system 12, with the optical axis X being extended through a center of the dichroic filter 18a. The dichroic filter 18b is arranged so as to define an angle of 135 (45) degrees with respect to the optical axis X, and to define an angle of 90 degrees with respect to the dichroic filter 18a, with the optical axis X also being extended through a center of the dichroic filter 18b. The total reflecting mirrors 18c and 18d are arranged parallel with the dichroic filters 18a and 18b, respectively, on the lateral sides of the optical axis X of the photographing lens system 12.

The dichroic filter 18a is constituted so as to reflect only red light, and the dichroic filter 18b is constituted to reflect only blue light. Accordingly, when a light beam passing through the photographing lens system 12 and carrying an optical image photographed thereby is made incident upon the dichroic filter 18a, a red light beam component is separated from the light beam by the dichroic filter 18a. Namely, the red light beam component of the light beam is reflected by dichroic filter 18a toward the total reflecting mirror 18c, and the remaining light beam passes through the dichroic filter 18a. Then, when the remaining beam is made incident upon the dichroic filter 18b, a blue light beam component is separated from the remaining light beam. Namely, the blue light beam component is reflected by dichroic filter 18b toward the total reflecting mirror 18d, and the remaining light beam, i.e., the green light beam component, passes through the dichroic filter 18b.

Thus, the light beam passing through the photographing lens system 12 is separated by the optical separator 18 into three primary color light beam components, i.e., the red light beam component, the green light beam component, and the blue light beam component. These three primary color light beam components cannot be focussed on a same image plane because the color light beam components travel along different optical paths, respectively. To focus the three primary color light beam components on the same image plane, two optical-path correction prisms 20a and 20b are provided in the optical paths along which the red and blue light beam components travel, respectively, as shown in FIG. 1.

A quick return mirror 22 is provided between the rear end face of the photographing optical system 12 and the optical separator 18, and is movable between a down-position i.e., an inclining position shown in FIG. 1 and an up-position, i.e., a horizontal position moved and rotated from the inclined position. At the inclined position, the quick return mirror 24 defines an angle of 45 (135) degrees with the optical axis of the photographing lens system 12, and thus reflects the light beam, passing through the photographing lens system 12, toward a finder mirror 14a of the view finder 14. The light beam is directed to a finder optical system of the view finder 14, whereby a photographer can observe an object to be photographed through an eye piece of the view finder 14. When a photographing operation is carried out by depressing the release switch 16, the quick return mirror 24 is moved (i.e., rotated from the inclined position to the horizontal position, and thus the light beam passing through the photographing lens system 12 is directed to the dichroic filter 18a of the optical separator 18.

A medium holder 24 is disposed at the rear side of the optical separator 18, and holds three electro-developing recording media RM therein. In FIG. 1, the medium holder 24 is positioned at a photographing position at which the light receiving surfaces of the three electro-developing recording mediums RM are included in the image plane defined by the photographing lens system 12 and the optical-path correction prisms 20a and 20b. When the photographing operation is executed by depressing the release switch 16, the optical image obtained from the photographing lens system 12 is focussed as a green optical image, a red optical image, and a blue optical image on the light receiving surfaces of the three electro-developing recording media RM, respectively, and these color images are recorded and developed therein. Note, each of the developed images is achromatic, but it has the color information of the image.

Figure 2:
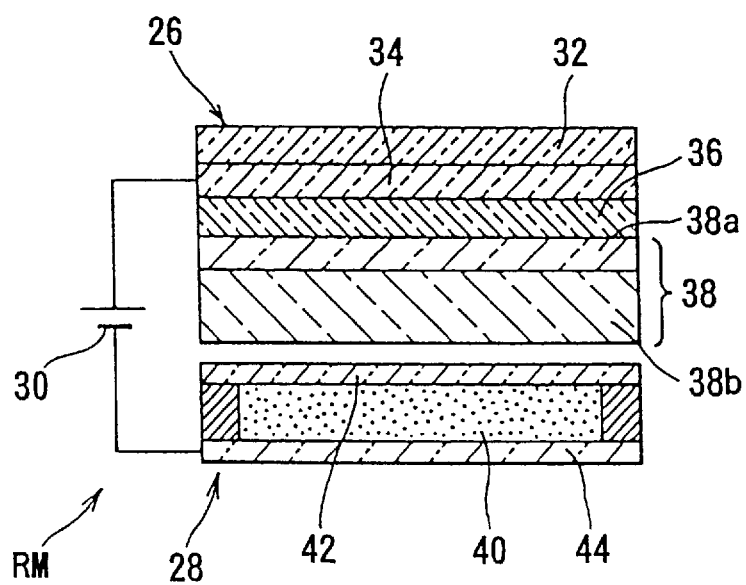
FIG. 2 is a schematic cross sectional view showing a structure of an electro-developing recording medium used in the electro-developing type camera shown in FIG. 1.

FIG. 2 shows an example of a structure of the electro-developing recording medium RM, and this medium is identical with that disclosed in the above-mentioned Japanese Unexamined Patent Publication No. 5-2280 and U.S. Pat. No. 5,424,156, the disclosures of which are expressly incorporated herein by reference in their entireties. The electro-developing recording medium RM comprises an electrostatic information recording medium 26 and an electric charge keeping medium 28, and a voltage is applied therebetween by an electric power source 30, illustrated symbolically in FIG. 2, while the photographing operation is carried out.

The electrostatic information recording medium 26 is formed by laminating a base plate 32, an electrode layer 34, an inorganic oxide material layer 36 and a photoconducting layer 38, and the photoconducting layer 38 is formed by laminating an electric charge generating layer 38a and an electric charge transferring layer 38b. The electric charge keeping medium 28 is formed by confining liquid crystal 40 between a liquid crystal supporting plate 42 and a liquid crystal electrode layer 44. The electric charge transferring layer 38b of the photoconducting layer 38 and the liquid crystal supporting plate 42 of the electric charge keeping medium 28 face each other with a small gap therebetween. Note, as is apparent from FIG. 2, the whole structure of the electro-developing recording medium RM is transparent.

When an optical image is formed on a light receiving surface of the electrostatic information recording medium 26 by the photographing optical system 12 during the application of the voltage between the electrostatic information recording medium 26 and the electric charge keeping medium 28, an electric charge distribution is produced over the electrostatic information recording medium 26 in accordance with a light intensity distribution of the optical image formed thereon, so that the intensity of an electric field acts on the liquid crystal 40 of the electric charge keeping medium 28 in accordance with the electric charge distribution. Thus, an image derived from the optical image is reproduced in the liquid crystal 40 as a visible image. Namely, as soon as the optical image is formed on the electrostatic information recording medium 26, the image is developed in the electric charge keeping medium 28.

Preferably, the electric charge keeping medium 28 is constituted as a liquid crystal display using a memory type liquid crystal. In this case, the developed visible image can be kept therein even if the electric field is eliminated from the electro-developing recording medium RM. In the memory type liquid crystal display, the developed image can be erased by heating it to a predetermined temperature, using, for example, an electric heater element (not shown). Thus, the same electro-developing recording medium RM can be repeatedly used for photographing.

Although not shown in FIG. 1, the camera comprises an image reader provided in the camera body 10, by which the developed color images of the three electro-developing recording mediums RM are optically and electronically read as a series of image signals. For example, the image reader is moved relative to the medium holder 24, and includes a linear light source, a focussing lens system, and a solid type image line sensor as a CCD (charge-coupled device) line sensor. The linear light source is constituted so as to emit a sheet-like light beam and to make the same pass through the electro-developing recording medium RM. The sheet-like light beam passing through the electro-developing recording medium RM is focussed on a linear light receiving surface of the CCD line sensor. The electro-developing recording medium RM is scanned with the sheet-like light beam emitted from the linear light source, by moving the image reader relative to the electro-developing recording medium RM, whereby the optical and electronic reading of the recorded and developed images can be carried out.

As is well known, the CCD line sensor serves as a photoelectric-conversion device for converting an optical image focussed thereon into electric pixel signals. These electric pixel signals are suitably processed, and are stored as image data in a second recording medium such as an IC memory card, a floppy disk, a hard disk or the like. Also, the processed image data may be outputted to a printer or a TV monitor through an interface connector 46 (FIG. 1).

Figure 3:
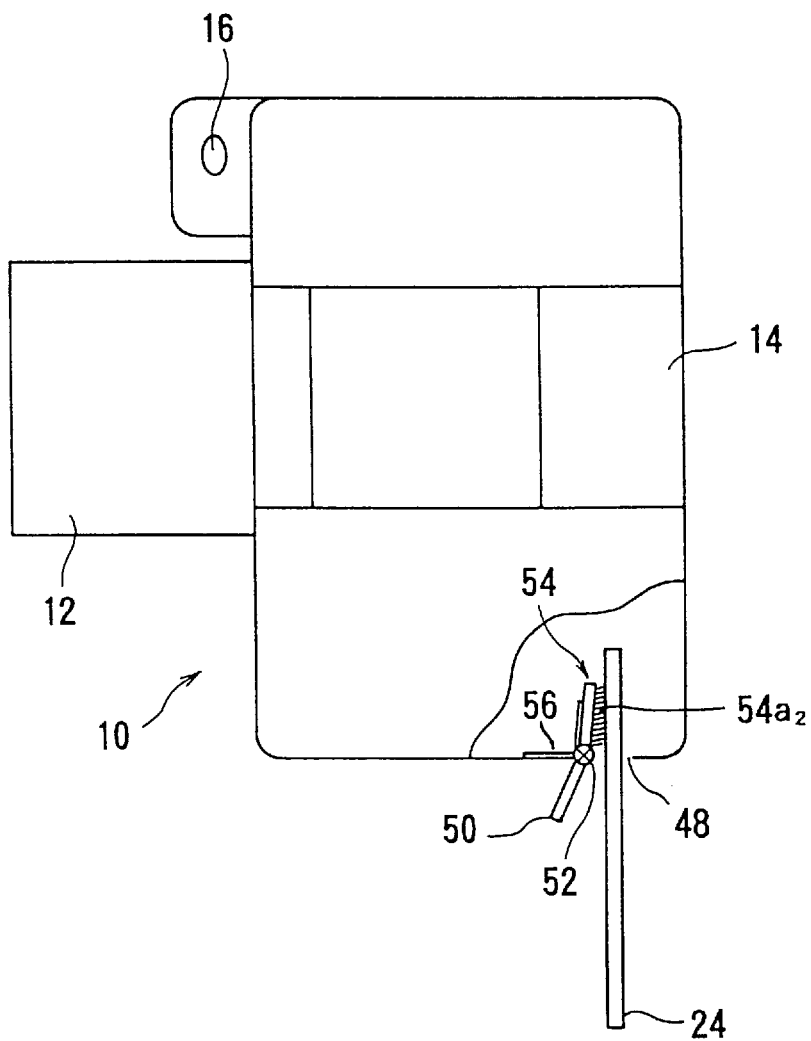
FIG. 3 is a partially-cut-away plan view of the electro-developing recording type camera shown in FIG. 1.

As shown in FIG. 3, the medium holder 24 carrying the three electro-developing mediums RM is manually inserted into the camera body 10 through a slot 48 formed in a side wall thereof which is usually closed by a leaf member 50, and the medium holder 24 is then moved toward the photographing position defined in the camera body 10. The leaf member 50 is rotatably mounted on a shaft 52 provided along one of the opposed side edges of the slot 48, and is movable between a closed position as shown in FIG. 1 and an open position as shown in FIG. 3. Also, an electric-charge-eliminating brush assembly 54 is rotatably mounted on the shaft 52, and is associated with a torsion spring 56 provided on the shaft 52, such that the brush assembly 54 is resiliently biased in the clockwise direction in FIG. 3. Note, the shaft 52 is formed of a suitable metal material such as steel, brass, copper, aluminium or the like, and is rotatably supported by a metal frame (not shown) provided in the camera body 10 such that an electrical connection is always established between the shaft 52 and the metal frame.

Figure 4:
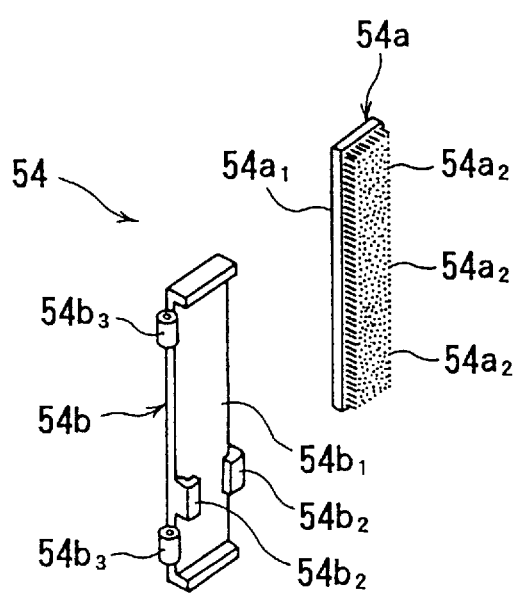
FIG. 4 is an exploded view of an electric-charge-eliminating brush assembly incorporated in the electro-developing type camera shown in FIG. 1.

As best shown in FIG. 4, the brush assembly 54 comprises a brush member 54*a*, and a holder member 54*b* for holding the brush member 54*a*. In particular, the brush member 54*a* includes a conductive plate element $54a_1$ and a plurality of conductive filament elements $54a_2$ planted therein to form a brush. The conductive plate element $54a_1$ is formed of a suitable conductive material such as a carbon-mixed plastic, or a suitable metal material such as steel, brass, copper, aluminum or the like, and each of the conductive filament elements $54a_2$ may be formed as a carbon fiber. On the other hand, the holder member 54*b* includes a plate-like holder $54b_1$ formed of a suitable conductive material such as a carbon-mixed resin material, or a suitable metal material such as steel, brass, copper, aluminum or the like and having a pair of flanges $54b_2$ integrally protruding from the side edges thereof.

When the plate-like holder $54b_1$ is formed of the carbon-mixed resin material, the flanges $54b_2$, $54b_2$ exhibit a resilient deformability. Also, When the plate-like holder $54b_1$ is formed of a metal material such as steel, brass, copper, aluminum or the like, the flanges $54b_2$, $54b_2$ exhibit a resilient deformability and/or a plastic deformability. In all cases, the flanges $54b_2$, $54b_2$ possess the deformability, and thus the brush member 54*a* can be easily held onto by the plate-like holder $54b_1$ due to the deformable flanges $54b_2$, $54b_2$. This also means that the brush member 54*a* can be easily removed from the plate-like holder $54b_1$ for cleaning, and that the brush member 54*a* can be easily exchanged with a new one.

Note, as shown in FIG. 4, the plate-like holder $54b_1$ of the holder member 54*b* also includes a pair of sleeve elements $54b_3$, $54b_3$ integrally formed therewith, and each of the sleeve elements $54b_3$, $54b_3$ serves as a bearing to rotatably receive the shaft 52.

Figure 5:
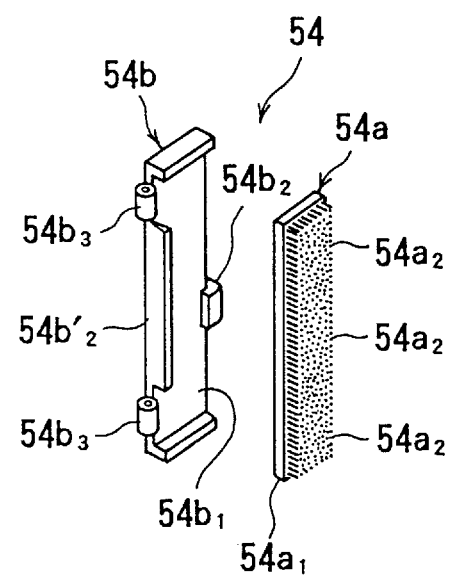
FIG. 5 is an exploded view of the electric-charge-eliminating brush assembly showing a modification of assembly shown in FIG. 4.

FIG. 5 shows a modification of the electric-charge-eliminating brush assembly 54 illustrated in FIG. 4. In FIG. 5, features similar to those of FIG. 4 are indicated by the same reference numerals. In the modified brush assembly 54, one of the flanges $54b_2$, $54b_2$ (FIG. 4) are replaced with a rib element $54b_2{}'$ integrally formed with the plate-like holder $54b_1$. Nevertheless, the brush member 54*a* can be easily held onto by the plate-like holder $54b_1$ due to the single deformable flange $54b_2$.

Figure 6:
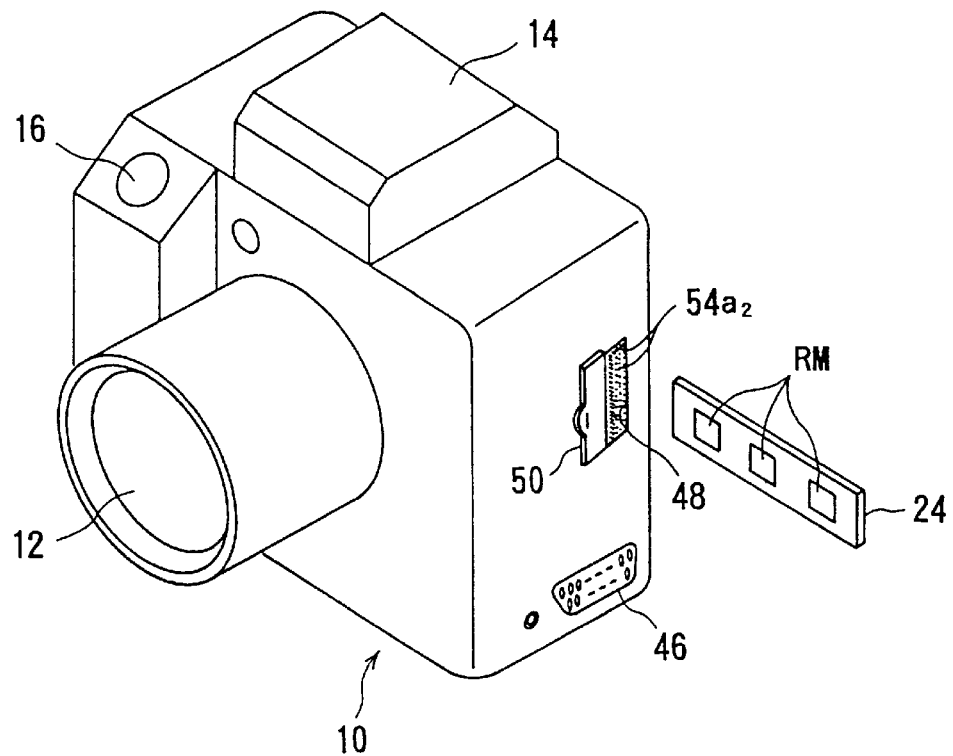
FIG. 6 is a schematic perspective view of the electro-developing recording type camera of FIG. 1, showing a medium holder carrying the electro-developing recording media just before inserting the same into the camera body through a slot formed in a side wall of the camera body.
Figure 7:
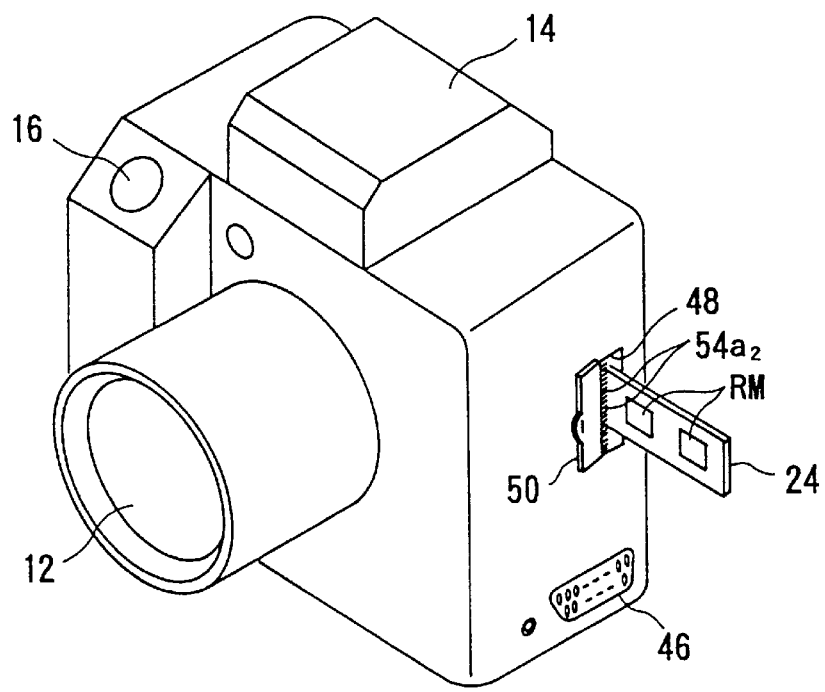
FIG. 7 is a schematic perspective view similar to FIG. 6, showing the medium holder carrying the electro-developing recording media partially inserted into the slot formed in the side wall of the camera body.

Although the electric-charge-eliminating brush assembly 54 is resiliently biased in the clockwise direction in FIG. 3 by the torsion spring 56 (FIG. 3), as mentioned above, the brush assembly 54 cannot be moved out of the opening of the slot 48, as shown in FIG. 6, because a size of the brush assembly 54 is somewhat larger than that of the opening of the slot 48. When the leaf member 50 is opened, the filament elements $54a_2$ are exposed out of the opening of the slot 48, as shown in FIG. 6. Nevertheless, the filament elements $54a_2$ are usually protected from being polluted by dust and so on, because the opening of the slot 48 is closed by the leaf member 50 (FIG. 1).

The leaf member 50 must be opened, as shown in FIG. 6, before the medium holder 24 can be inserted into the camera body 10 through the slot 48. Then, a leading end of the medium holder 24 is abutted and pressed against the electric-charge-eliminating brush assembly 54, resulting in rotation of the brush assembly 54 in the counterclockwise direction in FIG. 3. Thus, the medium holder 24 can be moved toward the photographing position as shown in FIG. 1, and the light receiving surfaces of the electro-developing recording media RM are contacted and swept with the brush ($54a_2$) during the passage of the holder medium 24 into the slot 48.

Accordingly, if the electro-developing recording-media RM are electrically charged due to triboelectrification, the electric charge can be discharged and eliminated from the medium RM to the metal frame of the camera body 10 through the conductive filament elements $54a_2$, the conductive plate element $54a_1$, the plate-like holder $54b_1$, and the shaft 52. At the same time, dust and so on can be easily and effectively removed from the light receiving surfaces of the electro-developing recording mediums RM due to the sweeping of the light receiving surfaces with the brush ($54a_2$) of the brush assembly 54, because the electrostatic attraction of dust, etc. to the media RM is removed from the media RM due to the elimination of the electric charge therefrom. Namely, the electric-charge-eliminating brush assembly 54 establishes an electric contact and a physical contact with respect to the light receiving surfaces of the electro-developing recording media RM during the passage of the medium holder 24 into the slot 48, resulting in the effective removal of dust, etc. from the electro-developing recording media RM.

FIGS. 8 to 13 show a second embodiment of an electro-developing type camera according to the present invention. In these drawings, the features similar to those of the first embodiment shown in FIGS. 1 to 7 are indicated by the same reference characters.

Figure 8:
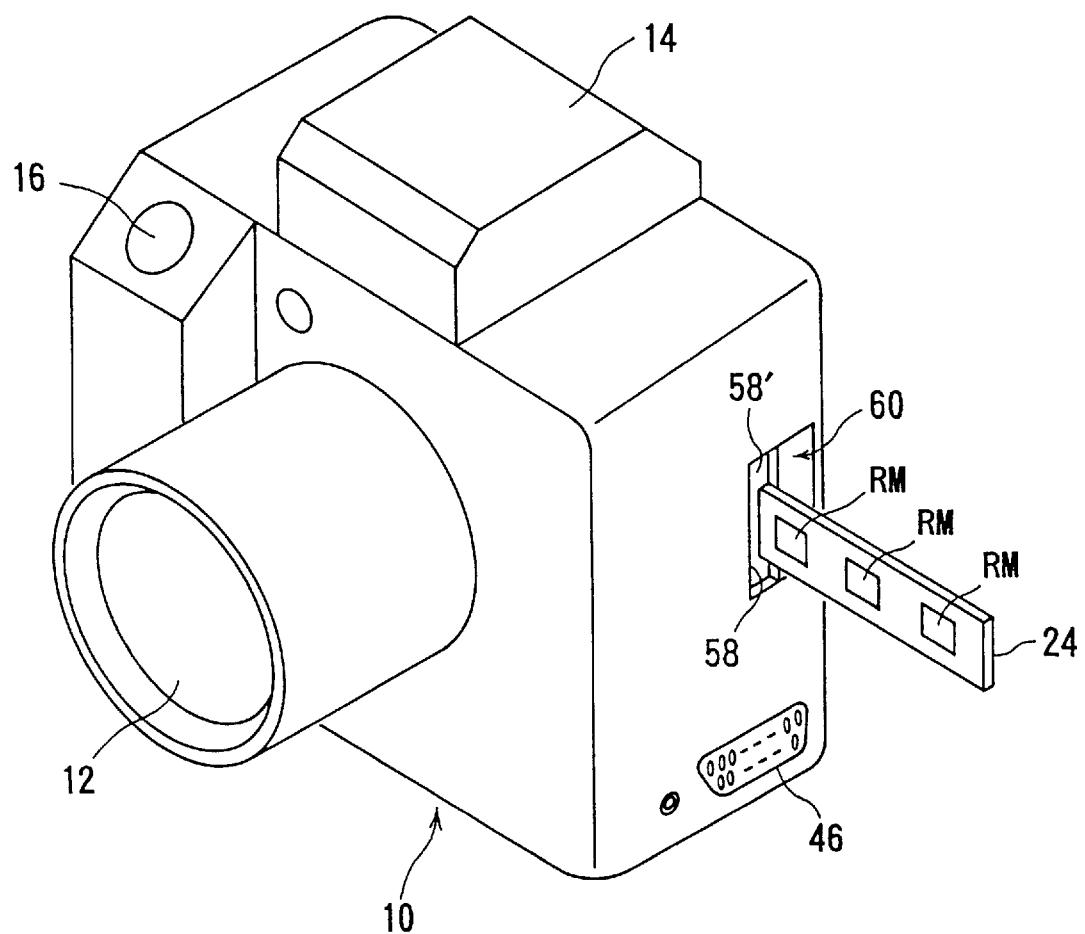
FIG. 8 is a schematic perspective view showing a second embodiment of an electro-developing type camera using an electro-developing recording medium according to the present invention.
Figure 9:
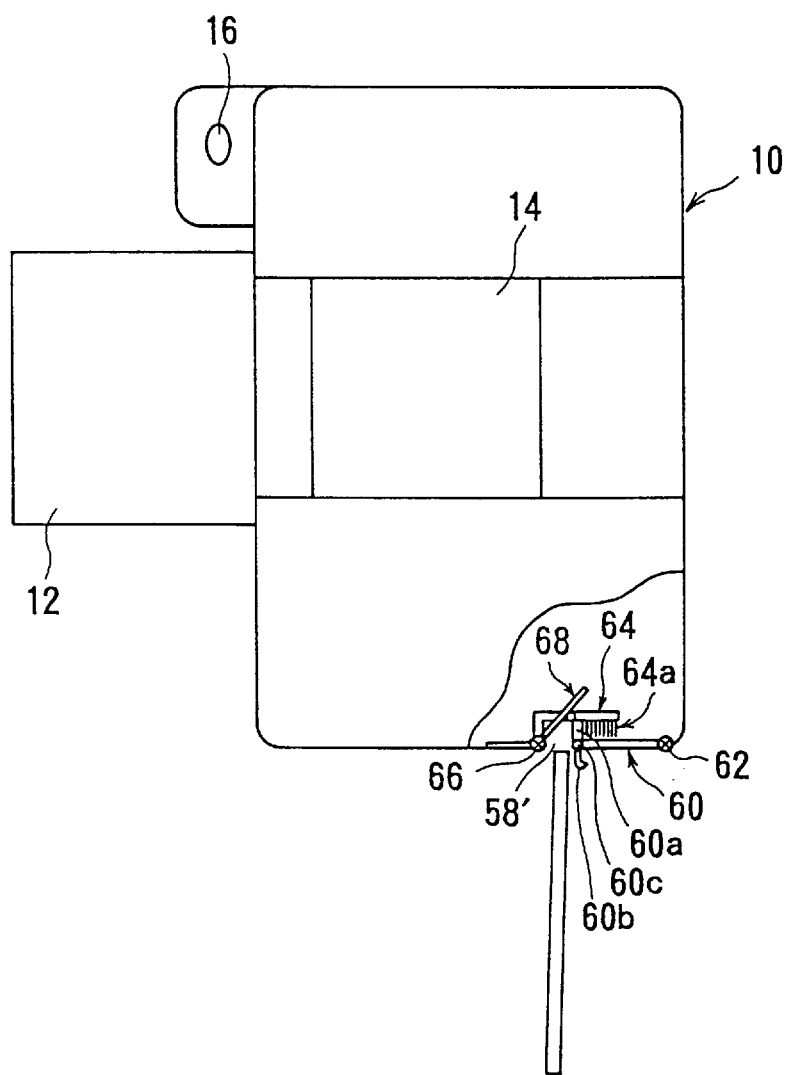
FIG. 9 is a partially-cut-away plan view of the electro-developing recording type camera shown in FIG. 8.

In the second embodiment, the camera body 10 has a rectangular opening 58 formed in a side wall thereof, and the rectangular opening 58 is partially closed by a leaf member 60 such that a part of the rectangular opening 58 is defined as a slot 58', as shown in FIGS. 8 and 9. The medium holder 24 carrying the three electro-developing recording media RM is inserted into the camera body 10 through the slot 58'. The leaf member 60 is rotatably mounted on a shaft 62 provided along one of the opposed side edges of the rectangular opening 58. An electric-charge-eliminating brush member 64 is constituted as a second leaf member having a L-shaped cross section and rotatably mounted on a shaft 66 provided along the other side edge of the rectangular opening 58, as shown in FIG. 9. The brush member 64 is provided with a plurality of conductive filament elements 64a arranged to form a brush. The brush member or second leaf member 64 is associated with a torsion spring 68, provided on the shaft 66, so as to be resiliently biased in the clockwise direction in FIG. 9, and cooperates with the first leaf member 60 to close the slot 58'.

Figure 10:
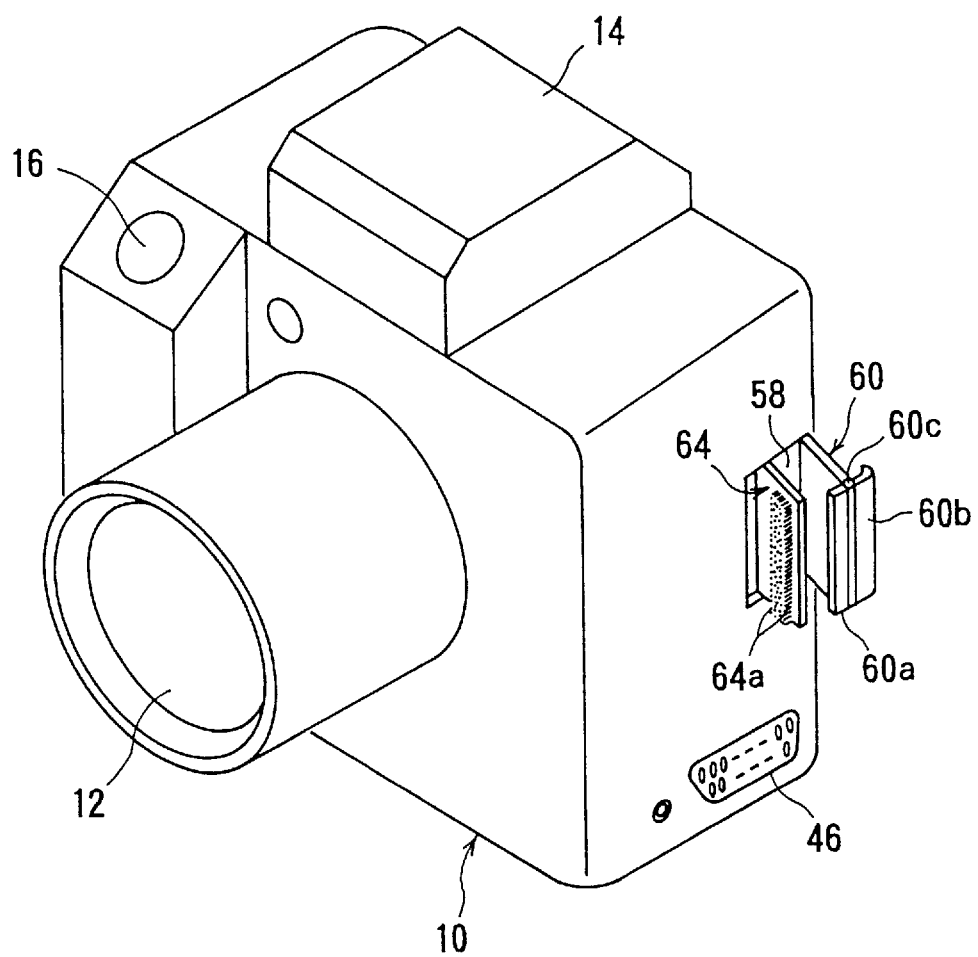
FIG. 10 is a schematic perspective view showing a leaf member and an electric-charge-eliminating brush member moved out of a rectangular opening formed in a side wall of a camera body.
Figure 11:
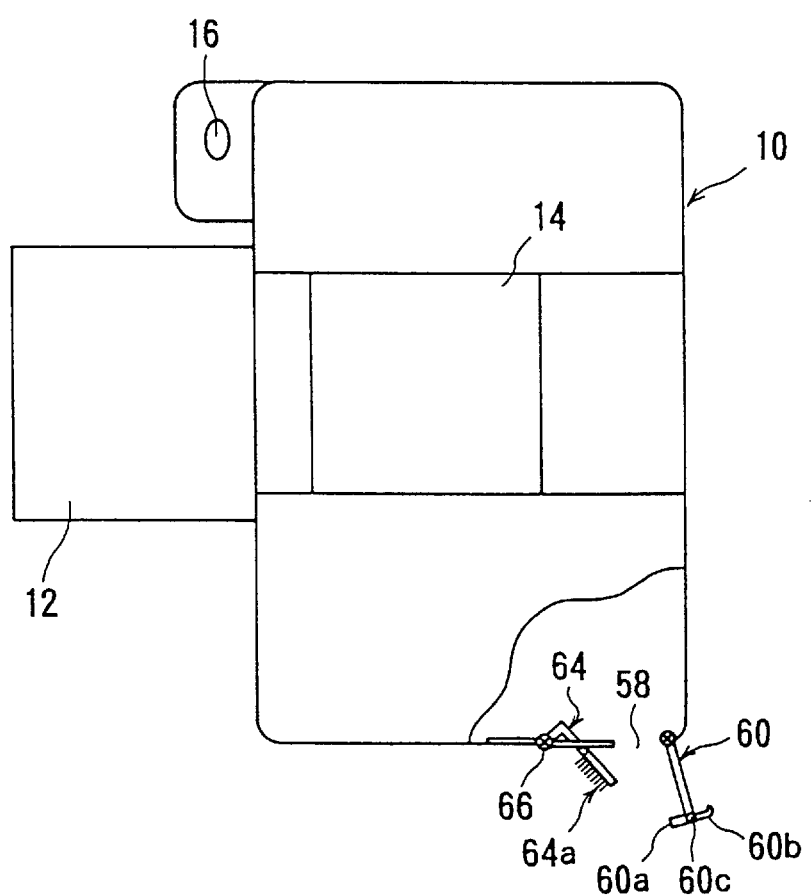
FIG. 11 is a partially-cut-away plan view of the electro-developing recording type camera shown in FIG. 9.
Figure 12:
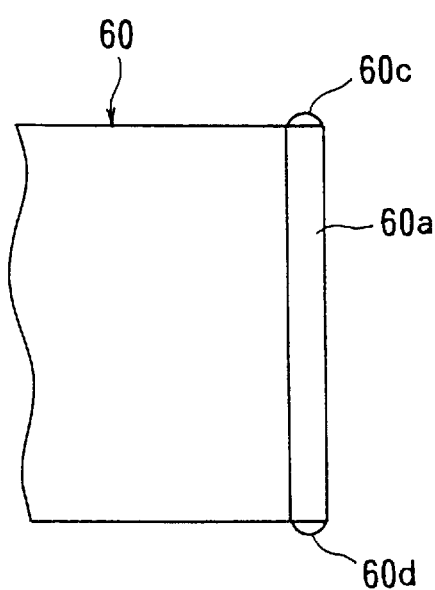
FIG. 12 is an enlarged elevation view showing a part of the leaf member shown in FIGS. 10 and 11.

In particular, the first leaf member 60 can be rotated from a closed position as shown in FIGS. 8 and 9 to an open position as shown in FIGS. 10 and 11, and includes a stopper element 60a protruding from a rear edge of the free end thereof, and a knob element 60b protruding from a forward edge of the free end thereof. Also, as best shown in FIG. 12, the first leaf member 60 has a pair of semi-spherical protrusions 60c and 60d formed at the upper edge and lower edges of the free end thereof. When the first leaf member 60 is forcibly pressed into the rectangular opening 58, each of the semi-spherical protrusions 60c and 60d thereof is snugly engaged in a semi-spherical recess (not shown) formed in the metal frame provided in the camera body 10, whereby the first leaf member 60 is locked at the closed position as shown in FIGS. 8 and 9. The brush member or second leaf member 64 is resiliently biased in the clockwise direction in FIG. 9, as mentioned above, and is thus abutted against the stopper element 60a of the first leaf member 60 locked at the closed position, and thus the slot 58' is closed by the brush member or second leaf member 64.

Also, when the first leaf member 60 is pulled in the counterclockwise direction in FIG. 9, by pinching the knob element 60b with two fingers, for example, the thumb and the forefinger of a user, each of the semi-spherical protrusions 60c and 60d thereof is disengaged from the semi-spherical recess. Then, the brush member 64 is projected out of the rectangular opening 58, as shown in FIGS. 10 and 11, and thus the filament elements 64a can be easily cleaned.

In the second embodiment, the shaft 66, on which the brush member 64 is rotatably mounted, is formed of a suitable metal material such as steel, brass, copper, aluminium or the like, and is rotatably supported by the metal frame of the camera body 10 such that an electrical connection is always established between the shaft 66 and the metal frame. Also, the brush member 64 is formed of a suitable conductive material such as a carbon-mixed resin material, or a suitable metal material such as steel, brass, copper, aluminum or the like, and each of the filament elements 64a may be formed as a carbon fiber.

Figure 13:
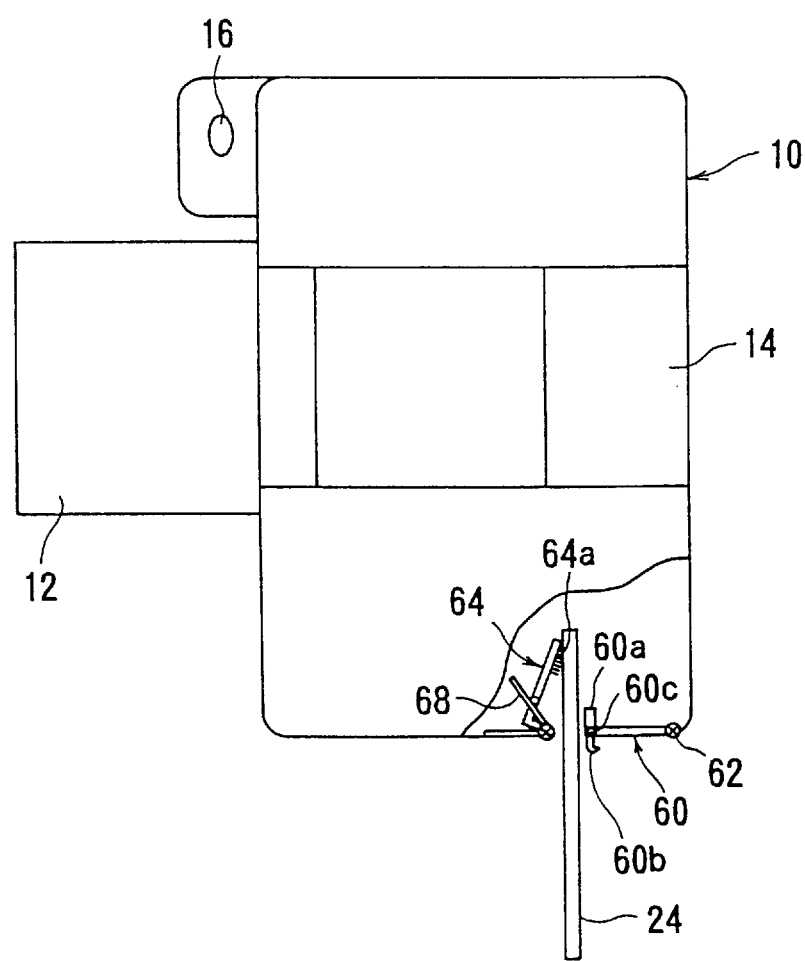
FIG. 13 is a partially-cut-away plan view showing a medium holder carrying three electro-developing recording mediums partially inserted into a slot defined as a part of the rectangular opening by the leaf member.

When the medium holder 24 is inserted into the camera body 10 through the slot 58', a leading end of the medium holder 24 is abutted and pressed against the electric-charge-eliminating brush member 64, resulting in rotation of the brush member 64 in the counterclockwise direction in FIG. 9. Thus, the medium holder 24 can be moved toward the photographing position as shown in FIG. 13, and the light receiving surfaces of the electro-developing recording media RM are contacted and swept with the brush (64a) during the passage of the holder medium 24 into the slot 58'.

Accordingly, if the electro-developing recording media RM are electrically charged due to triboelectrification, the electric charge can be discharged and eliminated from the medium RM via the metal frame of the camera body 10 through the conductive filament elements 64a, the conductive brush member or second leaf member 64, and the shaft 66. At the same time, dust, etc. can be easily removed from the light receiving surfaces of the electro-developing recording media RM due to the sweeping of the light receiving surfaces with the brush (64a), because the electrostatic attraction of dust and so on to the media RM is removed from the media RM due to the elimination of the electric charge therefrom. Namely, similar to the first embodiment, the electric-charge-eliminating brush member 64 establishes an electric contact and a physical contact with respect to the light receiving surfaces of the electro-developing recording media RM during the passage of the medium holder 24 into the slot 58', resulting in the effective removal of dust, etc. from the electro-developing recording media RM.

Figure 14:
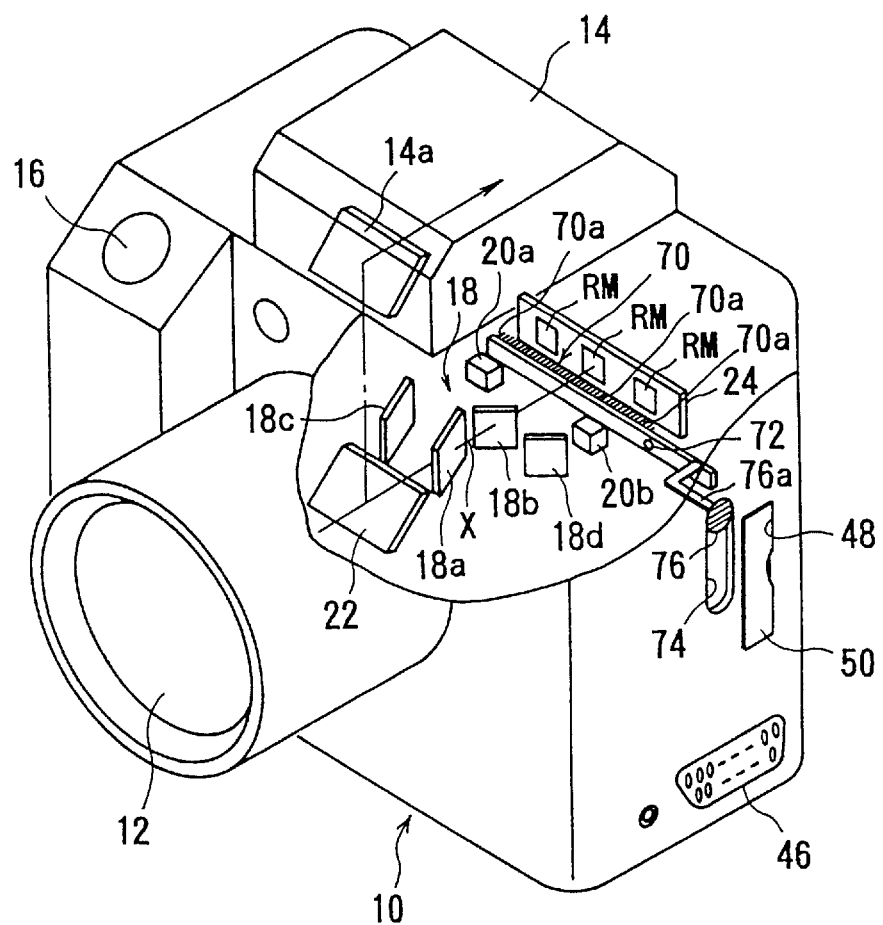
FIG. 14 is a partially-cut-away schematic perspective view showing a third embodiment of an electro-developing type camera using an electro-developing recording medium according to the present invention.
Figure 15:
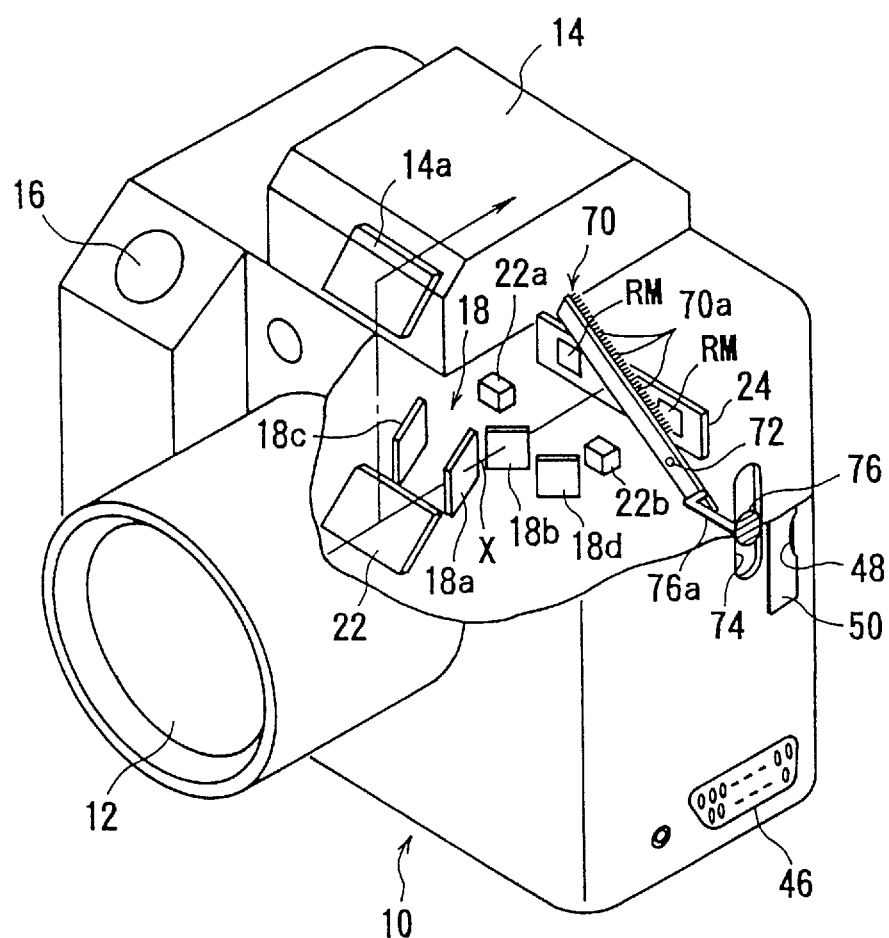
FIG. 15 is a partially-cut-away schematic perspective view showing an electric-charge-eliminating brush member at a different position than in FIG. 14.

FIGS. 14 and 15 show a third embodiment of an electro-developing type camera according to the present invention. In these drawings, the features similar to those of the first embodiment shown in FIGS. 1 to 7 are indicated by the same reference characters.

In the third embodiment, an electric-charge-eliminating brush member 70 is constituted as an elongated lever arm member rotatably mounted on a shaft 72, and is provided with a plurality of conductive filament elements 70a to form a brush. In FIG. 14, the brush member (i.e., lever arm member) 70 is disposed and extended between the two optical-path correction prisms 20a and 20b and the medium holder 24 positioned at the photographing position, such that the formation of color optical images on the electro-developing recording media RM is not interfered with by the lever arm member 70. Similar to the cases as mentioned above, the lever arm member 70 is formed of a suitable conductive material such as a carbon-mixed resin material, or a suitable metal material such as steel, brass, copper, aluminum or the like, and each of the filament elements 64a may be formed as a carbon fiber. The shaft 72 is supported by the metal frame provided in the camera body 10, and is formed of a suitable metal material such as steel, brass, copper, aluminum or the like so that an electric connection is always established between the shaft 72 and the metal frame.

The camera body 10 has an elongated groove 74 formed in a side wall thereof, and a slider element 76 is slidably received in the elongated groove 74. The slider element 76 is provided with a bar element 76a extending therefrom, and the bar element 76a has a bent portion formed at the free end thereof and engaged with one end of the brush member or lever arm member 70. When the slider element 76 is depressed down along the elongated groove 74, the brush member 70 is rotated in the clockwise direction, as shown in FIG. 15, whereby the light receiving surfaces of the electro-developing recording media RM are swept with the brush (70a).

Accordingly, if the electro-developing recording media RM are electrically charged due to triboelectrification, the electric charge can be discharged and eliminated from the medium RM to the metal frame of the camera body 10 through the conductive filament elements 70a, the conductive brush member or lever arm member 70, and the shaft 72. At the same time, dust, etc. can be easily removed from the light receiving surfaces of the electro-developing recording mediums RM due to the sweeping of the light receiving surfaces with the brush (70a), because the electrostatic attraction of dust, etc. to the media RM is removed from the media RM due to the elimination of the electric charge therefrom. Namely, similar to the first and second embodiments, the electric-charge-eliminating brush member 70 establishes an electric contact and a physical contact with respect to the light receiving surfaces of the electro-developing recording media RM positioned at the photographing position, resulting in the effective removal of dust, etc. from the electro-developing recording media RM.

The third embodiment provides that, whenever the slider element 76 is depressed down along the elongated groove 74, the elimination of electric charge from the electro-developing recording media RM can be carried out. In other words, in the third embodiment, a user can execute the removal of dust, etc. from the electro-developing recording media RM, at any time and as is necessary.

Note, in the third embodiment, the medium holder 24 is inserted into the camera body 10 through the slot 48 usually closed by the leaf member 50, and is then moved to the photographing position as shown in FIGS. 14 and 15.

Figure 16:
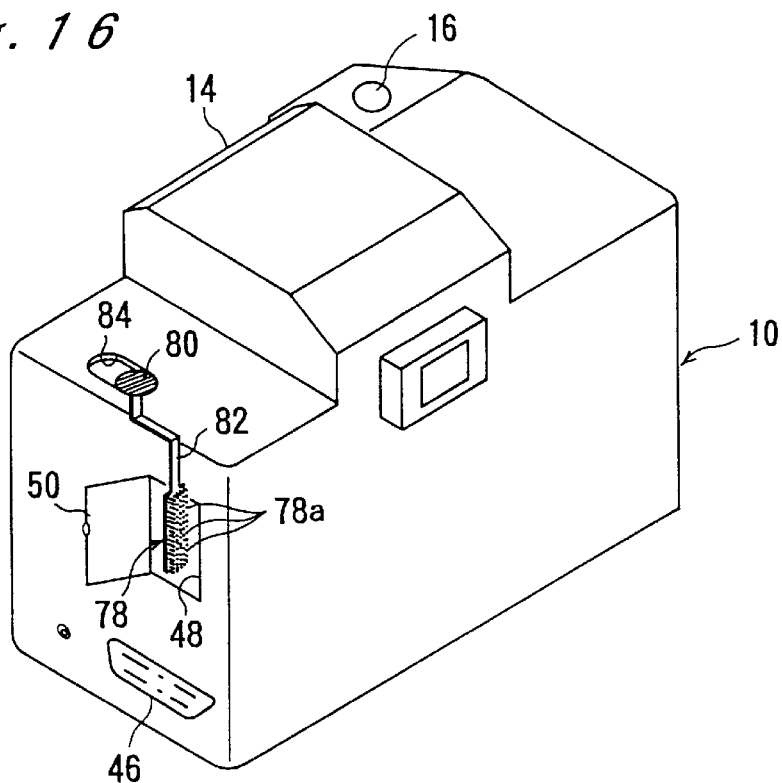
FIG. 16 is a schematic perspective view showing a fourth embodiment of an electro-developing type camera using an electro-developing recording medium according to the present invention.
Figure 17:
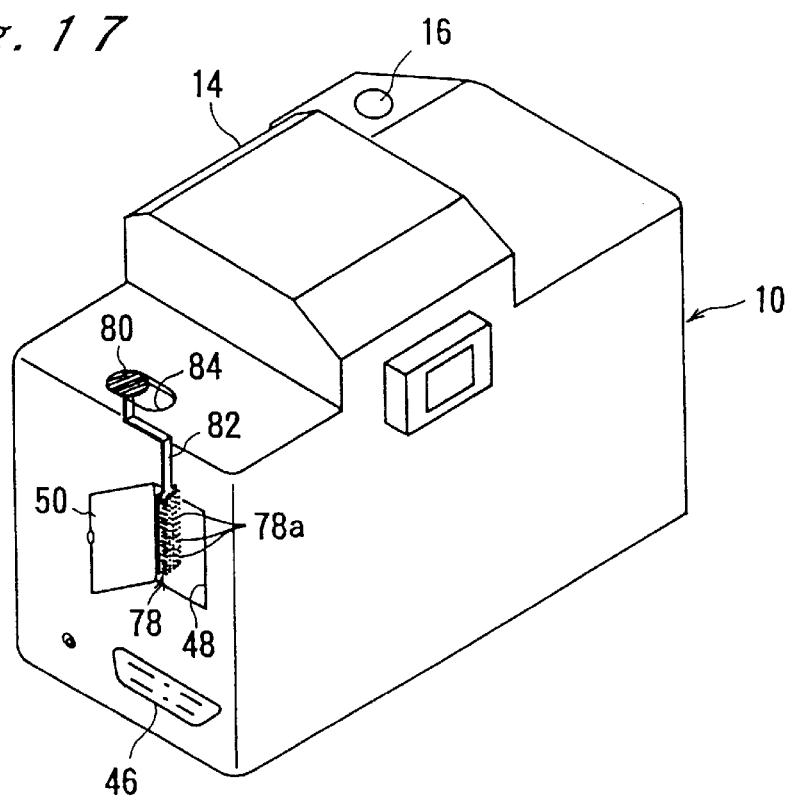
FIG. 17 is a schematic perspective view showing an electric-charge-eliminating brush member at a different position than in FIG. 1b.

FIGS. 16 and 17 show a fourth embodiment of an electro-developing type camera according to the present invention. In these drawings, the features similar to those of the first embodiment shown in FIGS. 1 to 7 are indicated by the same reference characters.

In the fourth embodiment, an electric-charge-eliminating brush member 78 is suspended from a slider element 80 through the intermediary of a shaped bar element 82. The brush member 78 is constituted as a plate-like member, and is provided with a plurality of conductive filament elements 78a to form a brush. The slider element 80 is slidably received in an elongated groove 84 formed in the side end of the top wall of the camera body 10 adjacent to the side wall thereof in which the slot 48 is formed. Each of the brush member 78, the bar element, and the slider element 80 is formed of a suitable conductive material such as a carbon-mixed resin material, or a suitable metal material such as steel, brass, copper, aluminum or the like, and each of the filament elements 64a may be formed as a carbon fiber. The slider element 80 is in contact with the metal frame provided in the camera body 10, and thus an electric connection is always established therebetween.

The slider element 80 is movable between a position as shown in FIG. 16 and a position as shown in FIG. 17. When the slider element 80 is at the position of FIG. 16, the brush member 78 is positioned at a charge-eliminating position. When the slider element 80 is at the position of FIG. 17, the brush member 78 is positioned at a retracted position.

When the brush member 78 is at the charge-eliminating position (FIG. 16), and when the medium holder 24 is inserted into the camera body 10 through the slot 58, the light receiving surfaces of the electro-developing recording media RM are swept with the brush (78a) during the movement of the medium holder 24 to the photographing position.

Accordingly, if the electro-developing recording media RM are electrically charged due to triboelectrification, the electric charge can be discharged and eliminated from the medium RM to the metal frame of the camera body 10 through the conductive filament elements 78a, the conductive bar element 82, and the conductive slider element 80. At the same time, dust, etc. can be easily removed from the light receiving surfaces of the electro-developing recording media RM due to the sweeping of the light receiving surfaces with the brush (78a), because the electrostatic attraction of dust and so on to the media RM is removed from the media RM due to the elimination of the electric charge therefrom. Namely, similar to the above-mentioned embodiments, the electric-charge-eliminating brush member 78 establishes an electric contact and a physical contact with respect to the light receiving surfaces of the electro-developing recording media RM during the passage of the medium holder 24 into the slot 48, resulting in the effective removal of dust, etc. from the electro-developing recording media RM.

When the brush member 78 is at the retracting position (FIG. 17), the light receiving surfaces of the electro-developing recording media RM cannot be swept with the brush (78a) during the passage of the medium holder 24 into the slot 48. Accordingly, in this case, the elimination of the electric charge from the media RM as well as the removal of dust, etc. from the media RM cannot be performed during the passage of the medium holder 24 into the slot 48. According to the fourth embodiment, when the electro-developing recording medium RM is not susceptible to triboelectrification, the slider element 80 may be set at the position as shown in FIG. 17, i.e., the brush member 78 may be at the retracted position.

Figure 18:
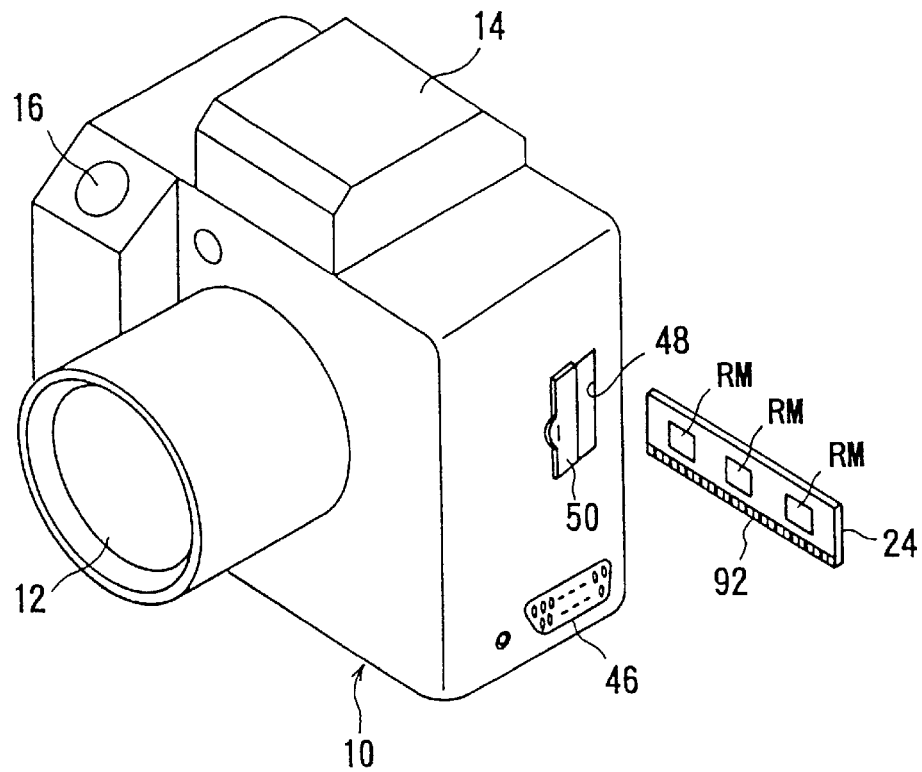
FIG. 18 is a schematic perspective view showing a fifth embodiment of an electro-developing type camera using an electro-developing recording medium according to the present invention.
Figure 19:
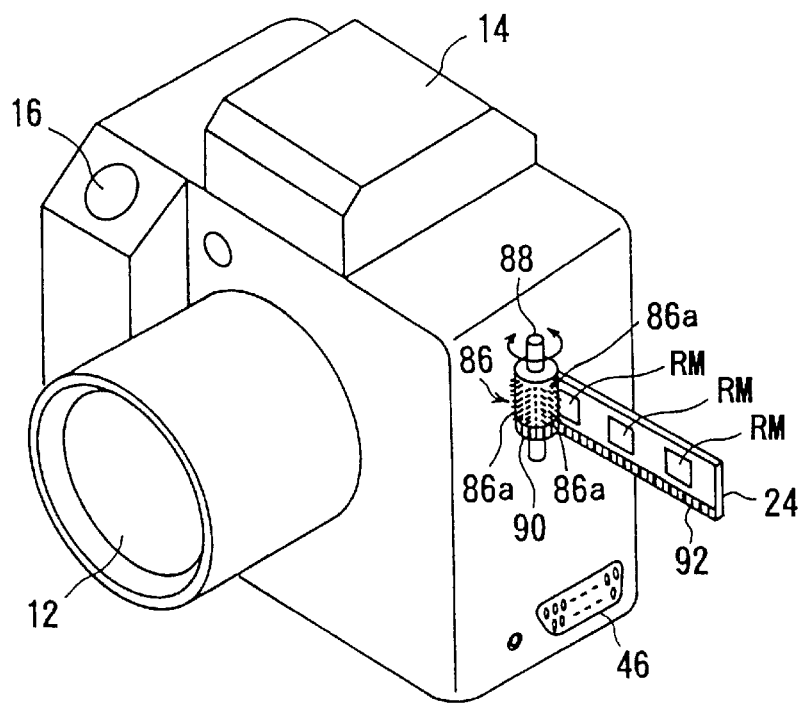
FIG. 19 is a schematic perspective view showing a medium holder carrying three electro-developing recording mediums partially inserted into a slot formed in a side wall of a camera body.

FIGS. 18 and 19 show a fifth embodiment of an electro-developing type camera according to the present invention. In these drawings, the features similar to those of the first embodiment shown in FIGS. 1 to 7 are indicated by the same reference characters.

In the fifth embodiment, as shown in FIG. 19, an electric-charge-eliminating brush member 86 is constituted as a roller member having a plurality of conductive filament elements 86a provided in a peripheral surface thereof to form a brush, and the brush member (i.e., roller member) 86 is formed of a suitable conductive material such as a carbon-mixed resin material, or a suitable metal material such as steel, brass, copper, aluminum or the like. The roller member 86 has a shaft 88 longitudinally extending therethrough, and the shaft 88 is also formed of a suitable conductive material such as a carbon-mixed resin material, or a suitable metal material such as steel, brass, copper, aluminum or the like. The shaft 88 is rotatably supported by the metal frame provided in the camera body 10, and thus an electric connection is always established therebetween.

The brush member (roller member) member 86 has a pinion 90 formed of a lower part thereof, as shown in FIG. 19, and the medium holder 24 has a rack 92 formed along a lower edge thereof, as shown in FIGS. 18 and 19. The brush member 86 is arranged in the camera body 10 beside the slot 48 usually closed by the leaf member 50, and is driven in either of the two rotational directions by a suitable drive source such a stepping motor (not shown).

When the medium holder 24 should be set at the photographing position, the brush member 86 is driven in the counterclockwise direction in FIG. 19. As soon as the medium holder 24 is inserted into the camera body 10 through the slot 48, the pinion 90 of the brush member 86 is meshed with the rack 92 of the holder medium 24, and thus the medium holder 24 is moved toward the photographing position. The light receiving surfaces of the electro-developing recording media RM are swept with the rotating brush (86a) during the movement of the medium holder 24 to the photographing position.

Accordingly, if the electro-developing recording media RM are electrically charged due to triboelectrification, the electric charge can be discharged and eliminated from the medium RM to the metal frame of the camera body 10 through the conductive filament elements 86a, the conductive roller element 86, and the shaft 88. At the same time, dust and so on can be easily removed from the light receiving surfaces of the electro-developing recording media RM due to the sweeping of the light receiving surfaces with the rotating brush (86a), because the electrostatic attraction of dust, etc. to the media RM is removed from the media RM due to the elimination of the electric charge therefrom. Namely, similar to the above-mentioned embodiments, the electric-charge-eliminating brush member 86 establishes an electric contact and a physical contact with respect to the light receiving surfaces of the electro-developing recording media RM during the passage of the medium holder 24 into the slot 48, resulting in the effective removal of dust and so on from the electro-developing recording media RM.

Note, in the fifth embodiment, when the brush member or roller member 86 is driven in the clockwise direction in FIG. 19 after a complete of the photographing operation, the medium holder 24 can be automatically discharged out of the camera boy 10 through the slot 48.

As is apparent from the foregoing, according to the present invention, the dust, etc. can be effectively removed from the electro-developing medium prior to the photographing operation, and thus a proper development of an optical image in the medium can be ensured during the photographing operation.

Finally, it will be understood by those skilled in the art that the foregoing description is of preferred embodiments of the disclosed electro-developing type camera, and that various changes and modifications may be made to the present invention without departing from the spirit and scope thereof.

The present disclosure relates to subject matter contained in Japanese Patent Application No. 7-146764 (filed on May 22, 1995), which is expressly incorporated herein, by reference, in its entirety.

We claim:

1. An electro-developing type camera that receives an electro-developing recording medium for recording and developing an optical image on the electro-developing recording medium, the electro-developing recording medium being contained within a recording medium holder, said electro-developing type camera comprising a camera body provided with a slot formed therein, said slot allowing for insertion of said recording medium holder into said camera and for movement of said recording medium holder toward a photographing position, said camera further comprising conductive electric-charge-eliminating means for eliminating an electric charge from the electro-developing recording medium, said conductive electric-charge-eliminating means being movably mounted so as to be resiliently biased towards said slot of said camera body to close said slot, thereby ensuring that said conductive electric-charge-eliminating means comes into electrical contact and physical contact with the electro-developing recording medium upon insertion of said recording medium holder, containing the electro-developing recording medium, into said electro-developing type camera through said slot of said camera body, wherein said conductive electric-charge-eliminating means eliminates said electric charge from the electro-developing recording medium in response to said electrical contact between said conductive electric-charge-eliminating means and the electro-developing recording medium contained within said recording medium holder, and removes particulate matter from the electro-developing recording medium in response to said physical contact between said conductive electric-charge-eliminating means and the electro-developing recording medium contained within said recording medium holder.

2. An electro-developing type camera as set forth in claim 1, wherein said conductive electric-charge-eliminating means comprises conductive brush means, and wherein said electric-charge-eliminating means is arranged proximate to the electro-developing recording medium when the electro-developing recording medium is inserted into said camera and moved toward a photographing position such that a light receiving surface of the electro-developing recording medium is swept by said conductive brush means.

3. An electro-developing type camera as set forth in claim 1, wherein said conductive brush means comprises a conductive brush assembly including a brush member, and a holder member for detachably holding said brush member.

4. An electro-developing type camera as set forth in claim 1, wherein said conductive brush means comprises a conductive brush member movable out of said slot.

5. An electro-developing type camera that receives an electro-developing recording medium contained within a recording medium holder, said electro-developing type camera recording and developing an optical image in the electro-developing recording medium, said electro-developing type camera comprising:

conductive electric-charge-eliminating means for eliminating electric charge from the electro-developing recording medium, said conductive electric-charge-eliminating means being arranged proximate to a photographing position at which the optical image is recorded on, and developed in the electro-developing recording medium, said electric-charge-eliminating means being selectively movable to establish electrical contact and physical contact with the electro-developing recording medium positioned at said photographing position, said electric-charge-eliminating means being arranged such that selective movement of said electric-charge-eliminating means is initiated externally of a camera body of said electro-developing type camera, said conductive electric-charge-eliminating means eliminating electric charge from the electro-developing recording medium in response to said electric contact between said conductive electric-charge-eliminating means and the electro-developing recording medium contained within said recording medium holder, and removing particulate matter from the electro-developing recording medium in response to said physical contact between said conductive electric-charge-eliminating means and the electro-developing recording medium contained within said recording medium holder.

6. An electro-developing type camera having a photographic lens system and a recording medium holder that contains an electro-developing recording medium in which an optical image is recorded and developed, said electro-developing type camera comprising a camera body provided with a slot formed therein, said slot allowing insertion of said recording medium holder into said camera and movement of said recording medium holder toward a photographing position, and a conductive electric-charge-eliminating device movably mounted so as to be resiliently biased towards said slot of said camera body to close said slot, thereby ensuring that said conductive electric-charge-eliminating device is in electrical contact and in physical contact with the electro-developing recording medium in response to insertion of said recording medium holder, containing the electro-developing recording medium, into said electro-developing type camera through said slot of said camera body, wherein said conductive electric-charge-eliminating device eliminates an electric charge from the electro-developing recording medium due to said electrical contact between said conductive electric-charge-eliminating device and the electro-developing recording medium contained in said recording medium holder, and removes particulate matter from the electro-developing recording medium due to said physical contact between said conductive electric-charge-eliminating device and the electro-developing recording medium contained in said recording medium holder.

7. An electro-developing type camera as set forth in claim 6, wherein said conductive electric-charge-eliminating device comprises a conductive brush, said electric-charge-eliminating device is arranged proximate to the electro-developing recording medium when the electro-developing recording medium is inserted into said camera and moved toward a photographing position such that a light receiving surface of the electro-developing recording medium is swept by said conductive brush.

8. An electro-developing type camera as set forth in claim 6, wherein said conductive brush comprises a conductive brush assembly including a brush member, and a holder member for detachably holding said brush member.

9. An electro-developing type camera as set forth in claim 6, wherein said conductive brush comprises a conductive brush member movable out of said slot.

10. An electro-developing type camera having a photographic lens system, and a recording medium holder containing an electro-developing recording medium upon which an optical image is recorded and developed, said electro-developing type camera comprising:

a conductive electric-charge-eliminating device arranged proximate to a photographing position at which the optical image is recorded on and developed in the electro-developing recording medium, said electric-charge-eliminating device being selectively movable to establish electrical contact and physical contact with the electro-developing recording medium positioned at said photographing position, such that said conductive electric-charge-eliminating device eliminates an electric charge from the electro-developing recording medium in response to said electrical contact between said conductive electric-charge-eliminating device and the electro-developing recording medium contained in said recording medium holder, and removes particulate matter from the electro-developing recording medium in response to said physical contact between said conductive electric-charge-eliminating device and the electro-developing recording medium contained in said recording medium holder, selective movement of said electric-charge-eliminating device being initiated externally of a camera body of said electro-developing type camera.

* * * * *